Aug. 20, 1968  D. H. REDMAN  3,398,342
AUTOMATIC BURNER HEIGHT CONTROL CIRCUIT
Filed Nov. 12, 1965  2 Sheets-Sheet 1

INVENTOR
DEREK HARRY REDMAN
BY  *Imirie and Smiley*
ATTORNEYS

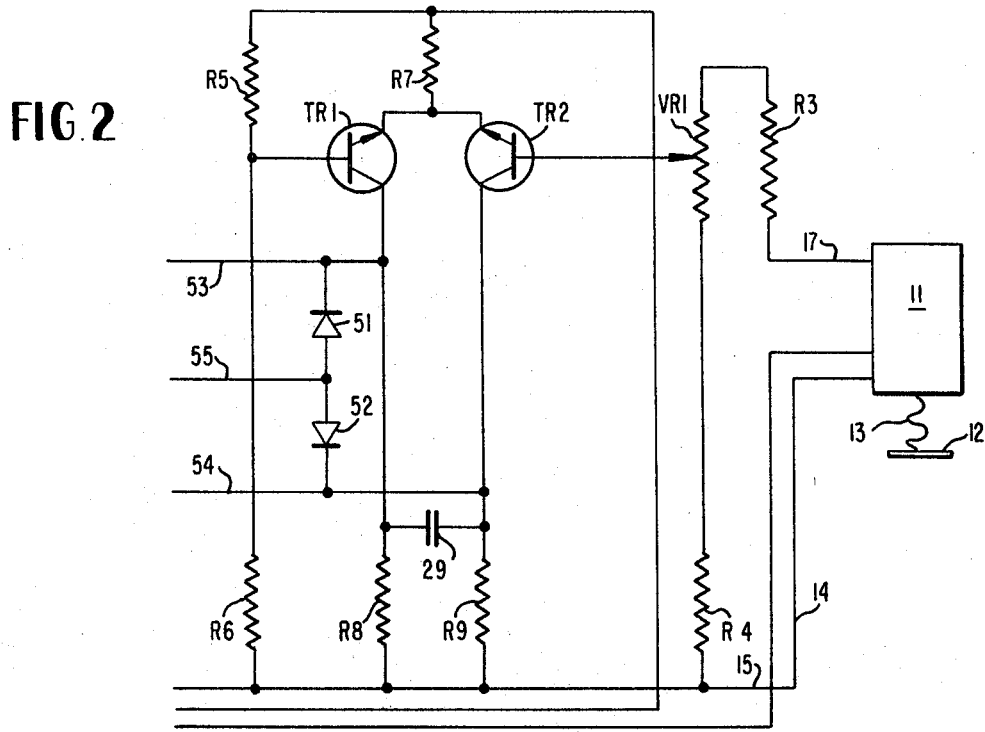
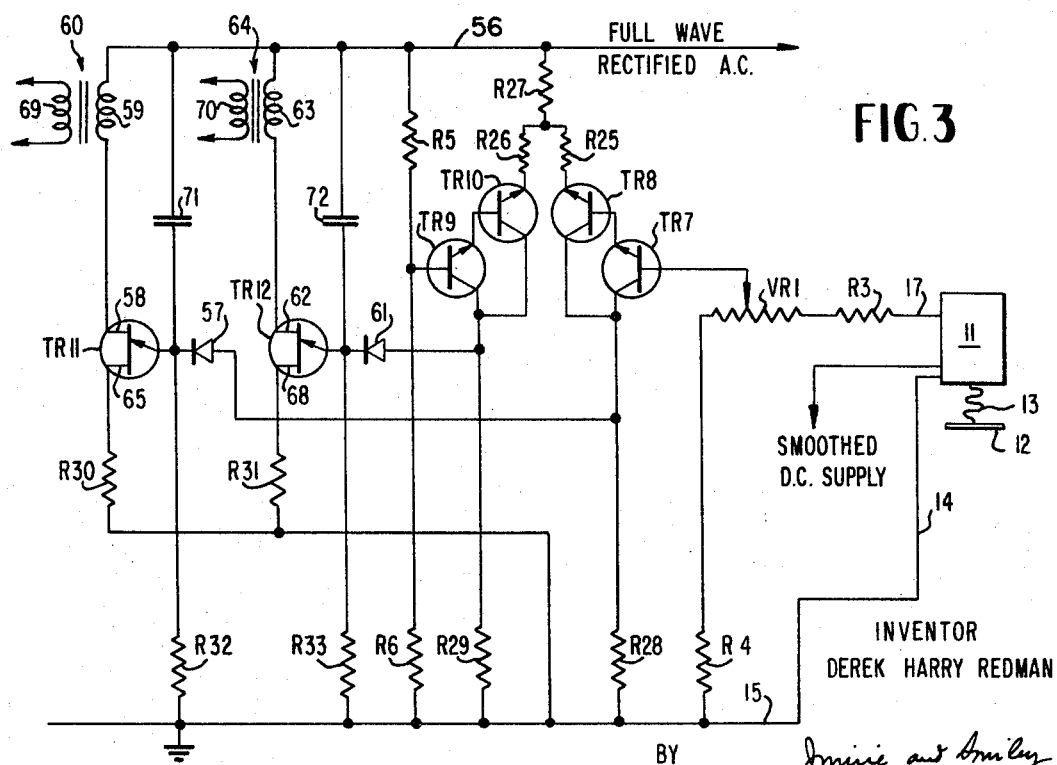

United States Patent Office 3,398,342
Patented Aug. 20, 1968

3,398,342
AUTOMATIC BURNER HEIGHT
CONTROL CIRCUIT
Derek H. Redman, Croydon, England, assignor to Hancock & Co. (Engineers) Limited, Croydon, England, a British company
Filed Nov. 12, 1965, Ser. No. 507,471
Claims priority, application Great Britain, Nov. 13, 1964, 46,328/64
10 Claims. (Cl. 318—18)

ABSTRACT OF THE DISCLOSURE

Electric circuit for actuating a motor which automatically raises and lowers the cutting burner of an oxygen jet cutting machine to maintain a constant height above a workpiece, using a probe movable with the burner whose capacitance with the workpiece is included in the circuit of an oscillator, differentially connected transistors fed respectively with a constant direct voltage and the oscillator output, the transistors controlling the two halves of a differential amplifier the outputs of which control gated rectifiers, the direction of rotation of the motor depending upon which of the gated rectifiers is conductive.

---

This invention relates to an electric circuit for automatically controlling the height of an oxygen jet cutting burner above a workpiece which is to be cut to shape. The invention is particularly applicable to the automatic cutting of workpieces to a shape in accordance with an outline drawn on a substrate, such as a sheet of drawing paper, in which a photoelectric line following device automatically follows the outline and the cutting burner automatically reproduces the movement of the follower, either directly or on a multiplied scale, over a workpiece and thereby cuts the workpiece to the desired shape.

In such an automatic cutting operation, in which the line follower moves over the outline at a constant speed and the burner is, therefore, required to cut through the workpiece at a constant speed, it is important that the cutting burner should be maintained at that height above the workpiece which produces the most efficient cutting. The object of the invention is to provide a control circuit, particularly for use in an oxygen jet cutting machine of the type described above, which will automatically maintain the cutting burner at the correct height while the machine is in operation.

Various proposals have been made for automatically controlling the height of a cutting burner and some of these depend on the use of a capacitive probe, that is, a capacitor plate which is kept above the workpiece so that any variation in the height of the probe with respect to the workpiece changes the electrical capacitance between the probe and the workpiece, and such changes are used to vary the burner height in such a way as to maintain a constant capacitance. The circuits according to the invention are of this general type but possess special advantages in compactness and simplicity, combined with a high degree of reliability.

The invention consists of a circuit for automatically maintaining the height of an oxygen jet cutting burner above a workpiece comprising a capacitive transducer including an oscillator and a capacitive probe adapted to be raised and lowered with the cutting burner, the capacitance existing between the probe and the workpiece being included in the oscillator circuit so that the raising and lowering of the burner causes a change in the tuning of the oscillator and the oscillator output varies with the capacitance, and comprising also a pair of differentially connected transistors one of which has a constant input voltage and the other of which has its input voltage controlled by the oscillator output, a differential amplifier fed with unsmoothed rectified alternating current the two halves of which are controlled by the outputs of the respective ones of the pair of differentially connected transistors, two controlled rectifiers, such as silicon controlled rectifiers, respectively controlled by the outputs of the two halves of the differential amplifier, and a direct current motor fed with unsmoothed rectified alternating current through the controlled rectifiers for raising and lowering the probe and burner, so arranged that the direction of rotation of the motor is dependent upon which of the controlled rectifiers is conductive.

In one form of the invention the two halves of the differential amplifier respectively control unijunction transistors which control the gates of the two silicon controlled rectifiers.

One embodiment of the invention will now be described with reference to the accompanying drawings, in which:

FIGURE 2 shows a modification of the circuit of FIGURE 1 to provide automatic control of the "dead band"; and FIGURE 3 shows a further modification employing unijunction transistors to "fire" the silicon controlled rectifiers.

Figure 1:
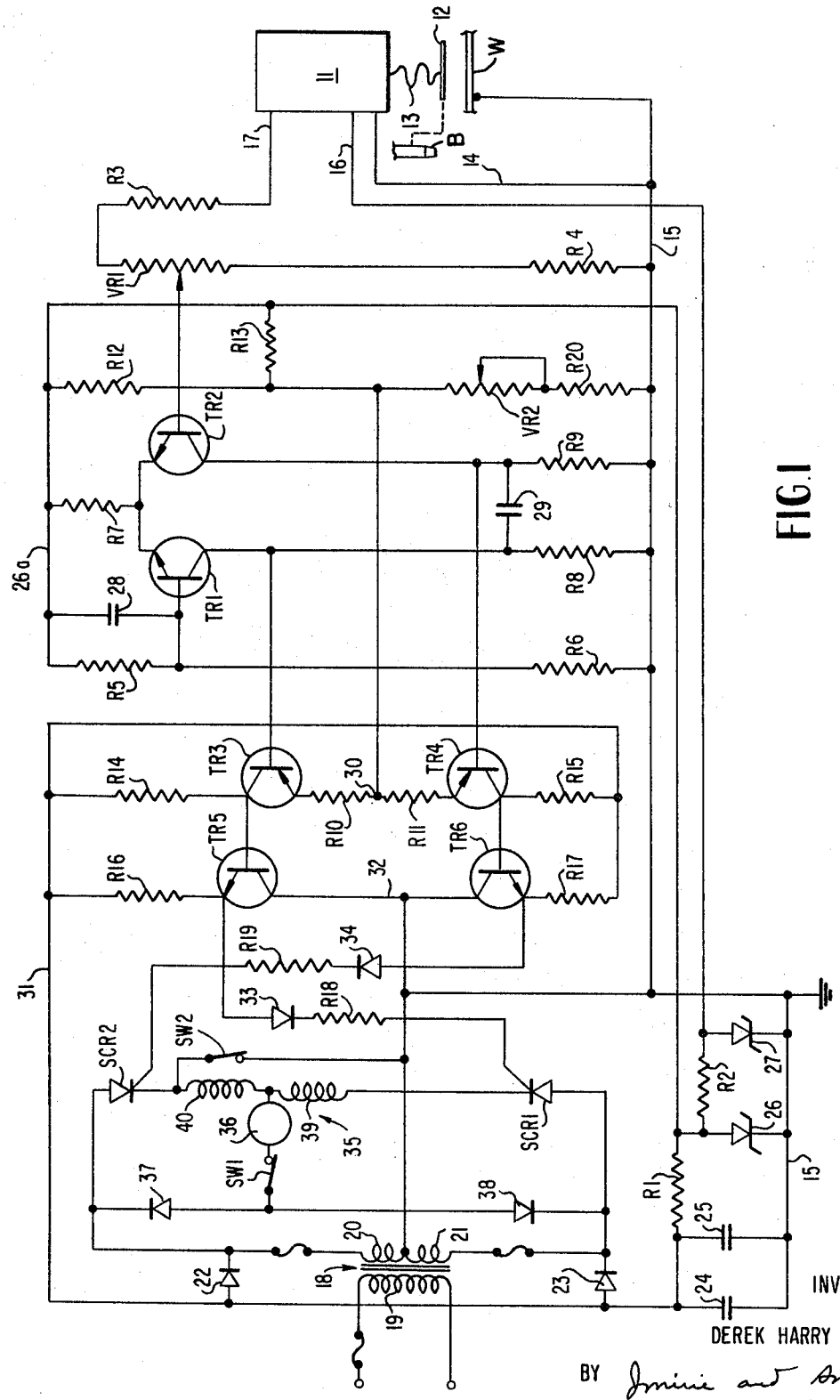
FIGURE 1 shows a control circuit for controlling the height of an oxygen jet cutting burner above a workpiece.

Referring initially to FIGURE 1, a capacitive transducer unit 11 contains an oscillator and related control components so arranged that the output is dependent upon the oscillator tuning. This type of transducer is known per se and is not a part of the invention. Such an oscillator transducer may be purchased in encapsulated form, in which the whole of the components are embedded in a block of a synthetic plastics material. The transducer unit 11 has one terminal which is connected to a capacitive probe 12 which is mounted with the oxygen jet cutting burner B of the cutting machine, the mechanical coupling between the cutting burner B and the probe 12 being indicated by dotted lines. It is shown connected to the transducer block by a flexible lead 13. Another connection 14 from the transducer unit 11 is connected to a ground or earth line 15 to which the workpiece W, in the form of a steel plate, a part of which is shown, is also connected. The capacitance between the capacitive probe 12 and the workpiece is included in the oscillatory circuit of the oscillator, so that the tuning of the oscillator varies with the capacitance. A further connection 16 to the transducer unit 11 provides the power supply to the transducer unit and a connection 17 is the output connection from the unit 11.

The power supply to the whole of the circuit is obtained through a transformer 18 having its primary winding 19 connected to the electric mains supply through an appropriate fuse. The transformer 18 has a centre-tapped secondary winding with two halves, respectively 20 and 21. The power for the transducer unit 11 and the initial part of the remaining circuitry is obtained from the secondary winding halves 20, 21 through fuses and two half-wave rectifiers, respectively 22 and 23, which feed a pair of reservoir and smoothing capacitors, respectively 24 and 25, connected in parallel between the rectifiers 22 and 23 and the ground line 15, which is a positive line.

The negative terminals of the capacitors 24 and 25 are connected through a resistor R1 to a Zener diode 26 which provides a supply at —30 volts to a pair of differentially connected transistors TR1 and TR2, to be more particularly referred to later. The Zener diode 26 acts as a voltage stabilizer to maintain the supply to the transistors TR1 and TR2 at an accurately controlled level. From the Zener diode 26 there is a further connection through a resistor R2 to a second Zener diode 27 which maintains the power supply at —12 volts through the line 16 to a very high degree of accuracy to the transducer unit 11. Since two Zener diodes connected in cascade are employed to stabilize the supply to the transducer unit 11 it will be evident that this supply is stabilized to a very high degree of precision, to ensure that the oscillator tuning is not affected by changes in the applied voltage.

The output line 17 from the transducer unit 11 is connected through a resistor R3, potentiometer VR1 and a resistor R4, all in series, to the ground line 15. The slider of the potentiometer VR1 is connected to the base of transistor TR2. On the other hand, the base of the transistor TR1 is maintained at a fixed potential by means of a voltage divider constituted by resistors R5 and R6 connected in series between the —30 volt line 26a and the ground line 15, the junction of the resistors R5 and R6 being connected to the base of TR1, the said base being decoupled by a capacitor 28. The two differentially connected transistors TR1 and TR2 are both n-p-n type and have a common emitter resistor R7.

The collector of transistor TR1 is connected through a resistor R8 to the common ground line 15 while the collector of transistor TR2 is connected through a resistor R9 of the same value as R8 to the common ground line 15, the two collectors being connected to the two sides of a capacitor 29.

Transistor TR1 has a high input impedance and this might normally produce a tendency for this transistor to "run away." This, however, is prevented by the common emitter resistor R7 and the substantial equality of the base impedances of TR1 and TR2, so that the circuit is very stable in operation.

From the circuitry which has so far been described it will be clear that the base of TR1 is normally maintained at a constant potential by the voltage divider constituted by R5 and R6, while the potential of the base of TR2 depends upon the output of the transducer unit 11. The circuit operates by moving the burner upwardly or downwardly until the potentials on the bases of TR1 and TR2 are equal and the set height of the burner may be varied by adjustment to the slider of potentiometer VR1, as will appear later. The circuit will then maintain the burner at this set height. Thus the potentiometer VR1 functions as an initial adjustment by which the desired height of the cutting burner above the workpiece may be set for the most efficient cutting.

The collector of transistor TR1 is connected to the base of a transistor TR3 while the collector of transistor TR2 is connected to the base of a transistor TR4. The transistors TR3 and TR4 are of p-n-p type. The emitter of TR3 is connected through a resistor R10 to a point 30, and the emitter of TR4 is connected through a resistor R11 of equal value to R10 to the same point 30. There is a voltage divider consisting of a resistor R12, a variable resistor VR2 and a resistor R20 connected in series between the —30 volt line and the ground line 15, there being a thermistor R13 connected in parallel with R12 in order to provide temperature compensation. The point 30 is connected to the junction of R12 and VR2. The resistor VR2 provides a variable "dead band" or tolerance within which the burner height may vary without actuating the automatic control. This is to prevent the circuit from making continuous minute up-and-down adjustments.

The collectors of transistors TR3 and TR4 are fed with rectified unsmoothed alternating current, i.e., a pulsating unidirectional current obtained from the rectifiers 22 and 23 through a line 31, the collector of TR3 being fed through a resistor R14 and the collector of TR4 being fed through a resistor R15 of equal value to R14. Normally, with the bases of transistor TR1 and TR2 at precisely the same potentials, the potentials on the bases of TR3 and TR4 are such that the latter transistors are just cut off. If the height of the capacitive probe 12 with respect to the workpiece should change, then the potential on the base of TR2 changes as the result of the change in output of the output line 17 from the transducer unit 11. Assuming that the change causes the base of transistor TR2 to go negative the current through the common emitter resistor R7 will be reduced. This causes the emitter of transistor TR1 to go negative, and since the base of transistor TR1 is maintained at a constant potential the collector current of TR1 rises. The changes on the collectors of TR1 and TR2 are transmitted to the bases of TR3 and TR4 so that one of them remains cut off while the other becomes conductive. Thus, pulses of current pass through one of the resistors R14 or R15 and one of the transistors TR3 or TR4 during the negative half-cycles of the pulsating supply on the line 31. The voltage changes at the collector of TR3 are transmitted to the base of a transistor TR5 while the voltage changes at the collector of TR4 are transmitted to the base of a transistor TR6, transistors TR5 and TR6 being of n-p-n type. The emitter of transistor TR5 is connected through a resistor R16 to the line 31 while the emitter of TR6 is connected through a resistor R17 of equal value to R16 to the line 31. The collectors of TR5 and TR6 are both connected to a common line 32 which is connected to the centre tap of the transformer secondary winding and to ground line 15. A little study will show that TR3 and TR4 constitute a differential amplifier and TR5 and TR6 are emitter followers, respectively for TR3 and TR4.

The emitter of TR5 is connected through a diode 33 and a resistor R18 to the gate electrode of a first silicon controlled rectifier SCR1, and the emitter of TR6 is connected through a diode 34 and a resistor R19 to the gate electrode of a second silicon controlled rectifier SCR2.

The end of the transformer secondary winding 20 is connected to the anode of SCR2, while the end of the transformer secondary winding 21 is connected to the anode of SCR1. The cathode of SCR1 is connected to one end of the split field winding of a direct current motor, generally indicated by reference 35, while the cathode of SCR2 is connected to the other end of the split field winding, the junction of the two halves 39 and 40 of the split field winding being connected to one brush of the armature 36 of the motor. The other brush of the armature 36 is connected to one pole of a manual stop switch SW1, the other pole of which is connected to the anodes of two diodes, respectively 37 and 38, the cathode of diode 37 being connected to the end of transformer winding 20 while the cathode of diode 38 is connected to the end of transformer winding 21.

When the apparatus is working normally and the potentials of TR1 and TR2 are balanced, the outputs at the emitters of TR5 and TR6 are either zero or so small that the gate electrodes of SCR1 and SCR2 are not opened and, in consequence, the two halves 39 and 40 of the motor field and the armature 36 receive no current so that the motor 35 is stationary. As soon as the height of the probe 12 above the workpiece changes, one or other of the transistors TR3 or TR4 passes a pulsating signal to the base of the respective cathode follower. Assuming that TR3 base is driven negative, then the collector of TR3 passes a series of pulses to the base of TR5 and the emitter of TR5 passes a series of pulses through the diode 33 and resistor R18 to the gate of SCR1 so that current pulses from the transformer winding 21 pass through SCR1, the half 39 of the motor field and the armature 36, which then begins to run in the direction to correct the height of the probe 12. If the opposite change takes place, then TR4 transmits pulses to the base of TR6 and the emitter of TR6 transmits pulses through diode 34 and resistor R9 to the gate to SCR2, and SCR2 passes pulses from the transformer winding 20 through the half 40 of the field of motor 35 and through the armature of the motor, so that the motor begins to run in the opposite direction.

As soon as the motor begins to run in one direction or the other the probe 12 is raised or lowered until the potential on the base of TR2 is again brought equal to the potential of the base of TR1, whereupon the transistor TR3 or TR4 which was conductive ceases to be so, the transistor TR5 or TR6, as the case may be, ceases to receive pulses and the gate of the respective silicon controlled rectifier which had been opened at each half-cycle of the power supply, remains closed. Since the anodes of the silicon controlled rectifiers receive a pulsating current which falls to zero at the end of each pulse, the silicon controlled rectifier which was operative ceases to conduct.

If it is desired to stop the automatic operation of the motor, this may be achieved very simply by opening the switch SW1, which is in series with the armature 36 of the motor and the two halves of the field winding.

A further control is provided by a second switch SW2 which is normally open. If this switch is closed (with the switch SW1 remaining closed) a circuit is established from the centre-tap of the windings 20, 21 through SW2, through the field half 40, the armature 36, the switch SW1, and the diode 37 to the end of the winding 20. The circuit is arranged so that the half 40 of the field normally causes the armature 36 to run in such a direction as to raise the burner of the probe 12. This provides an over-riding control since, even if the motor should be in the act of lowering the burner and the probe 12 to carry out an automatic adjustment, the closure of the switch SW2 over-rides this action and causes the burner and the probe 12 to be raised.

FIGURE 2 is a repetition of the right-hand portion of the circuit of FIGURE 1, showing a modification. In this modification the voltage divider chain composed of R12, VR2 and R20 of FIGURE 1 are omitted, as is the thermistor R13 in parallel with R12 and the capacitor 28. In FIGURE 1 the initial bias on the emitters of TR3 and TR4 is controlled by the voltage applied through the voltage divider circuit composed of R12, VR2 and R20 and this is adjustable by varying VR2, the effect of the adjustment being, as previously noted, to vary the "dead band" or the amount by which the actual height of the burner above the workpiece may vary without activating the control. In the circuit of FIGURE 2 the bias of TR3 and TR4 is controlled by a paid of diodes, respectively 51 and 52, which both have their anodes connected to the junction point of R10 ad R11 of FIGURE 1 through line 55 while the cathodes of diodes 51 and 52 are connected respectively to line 53 and 54 which are connected to the bases of the respective transistors TR3 and TR4 of the differential amplifier. With this arrangement the "dead band" is limited to the voltage below that at which the diodes begin to conduct and it is permanently set to this amount. Within limits the extent of the "dead band" may be varied by suitable choice of the diodes 51 and 52 from the large variety now available.

FIGURE 3 shows a further modification of the circuit of FIGURE 1. The transducer 11 and probe 12 are provided as before and the transducer output at line 17 feeds the voltage dividing circuit consisting of R3, VR1 and R4 as before, the slider of VR1 providing the input signal to the differentially connected transistors. However, instead of the single transistors TR1 and TR2, two Darlington pairs are employed, the first pair consisting of transistors TR7 and TR8 and the second pair consisting of transistors TR9 and TR10. The base of TR7 receives the input signal from the slider of VR1 while the base of TR9 is maintained at a constant potential by the voltage divider chain composed of R5 and R6. A resistor R25 has one end connected to the emitter of TR8 and a resistor R26 has one end conected to the emitter of TR10. The other ends of R25 and R26 are connected together and to one end of a resistor R27 which has its other end connected to a supply line 56. The supply line 56 is not supplied with smoothed direct current as in the case of FIGURE 1 but is instead supplied with full-wave rectified alternating current. Resitor R27 controls the "dead band," which can be varied by changing the value of this resistor.

The collector of TR7 is connected through a resistor R28 to the ground line 15 while the collector TR9 is connected through a resistor R29, equal in value to R28, to the ground line 15.

The base of TR11 is also connected to a capacitor 71 having its other side connected to the line 56 and it is also connected to one end of a resistor R32 having its other end connected to the ground line 15. The base of transistor TR12 is also connected to one side of a capacitor 72 having its other side connected to the power line 56 and the base is also connected to one end of a resistor R33 having its other end connected to the ground line 15.

The collector of TR7 is connected through a diode 57 to the base of unijunction transistor TR11 having an electrode 58 connected through the primary winding 59 of a transformer 60 to the line 56. Similarly, the collector of TR9 is connected through a diode 61 to the base of a further unijunction transistor TR12 having one electrode 62 connected through the primary winding 63 of a further transformer 64 to the supply line 56. The other electrode 65 of the unijunction transistor TR11 is connected through a resistor R30 to line 15. The remaining electrode 68 of the unijunction transistor TR12 is connected to one end of a resistor R31 which has its other end also connected to line 15.

The secondary winding 69 of the transformer 60 has one end connected to the gate of one of the silicon controlled rectifiers of FIGURE 1 and its other end connected to the cathode of the same rectifier, while the secondary winding 70 of the transformer 64 has one end connected to the gate of the other silicon controlled rectifier of FIGURE 1 and its other end connected to the cathode of the same rectifier.

With the modification of FIGURE 3 the differential amplifier of FIGURE 1, consisting of transistors TR3 and TR6, is not required and the diodes 33 and 34 and resistors R18 and R19 are also dispensed with.

In operation the transducer 11 produces an output voltage which varies with the height of the probe 12 above the workpiece and this is applied to the base of TR7, and since the base of TR9 is maintained at a fixed voltage level by R5 and R6 a variation in the height of the probe from the set level causes the base voltage of TR7 to be higher or lower than the base voltage of TR9. The direction of the unbalance determines which of the two unijunction transistors TR11 or TR12 fires at each half-cycle of the rectified alternating current. When one of the unijunction transistors fires a current pulse passes through the respective primary winding 59 or 63 of the respective transformer 50 or 64 and this induces a pulse voltage in the respective secondary winding 69 or 70 which causes the associated silicon controlled rectifier to conduct.

The magnitude of the unbalance voltage on the bases of TR7 and TR9 controls the point in the half-cycle at which the base of the unijunction transistor becomes sufficiently positive to fire and hence the point in the half-cycle of alternating current at which the respective silicon controlled rectifier fires. The silicon controlled rectifier maintains its conduction for the remainder of the half-cycle. Accordingly, the length of the period of conduction of the particular silicon controlled rectifier during each half-cycle varies with the degree of unbalance at the bases of TR7 and TR9, and hence the speed of the motor will also vary in dependence upon the degree of unbalance. The direction of rotation of the motor (to raise or lower the probe and burner) will depend upon the direction of unbalance in the base voltages of TR7 and TR9.

From the foregoing description it will be clear that the circuits described provides a very efficient and reliable automatic control for the height of a cutting burner. It will also be clear that various modifications of the embodiments described, or alternative embodiments, may be devised within the scope of the invention as defined in the appended claims. For example, instead of using a split field motor, as shown in FIGURE 1, and causing either one or other of the halves of the field to be energized to cause the motor to run in one direction or the other, a motor with a permanently energized single field may be used and the circuitry may be arranged so that the direction of the current through the armature is reversed in order to reverse the motor, the voltage applied to the armature being varied in order to vary the speed, the silicon controlled rectifiers controlling the direction of the armature current.

I claim:

1. A circuit for automatically maintaining the height of an oxygen jet cutting burner above a workpiece comprising a capacitive transducer including an oscillator and a capacitive probe adapted to be raised and lowered with the cutting burner, the capacitance existing between the probe and the workpiece being included in the oscillator circuit so that the raising and lowering of the burner causes a change in the tuning of the oscillator and the oscillator output varies with the capacitance, and comprising also a pair of differentially connected transistors one of which has a constant input voltage and the other of which has its input voltage controlled by the oscillator output, a differential amplifier fed with unsmoothed rectified alternating current the two halves of which are controlled by the outputs of the respective ones of the pair of differentially connected transistors, two controlled rectifiers respectively controlled by the outputs of the two halves of the differential amplifier, and a direct current motor fed with unsmoothed rectified alternatiing current through the controlled rectifiers for raising and lowering the probe and burner, so arranged that the direction of rotation of the motor is dependent upon which of the controlled rectifiers is conductive.

2. A circuit as claimed in claim 1 comprising means to adjust the proportion of the transducer output which is applied to the base of the said other transistor in order to adjust the height at which the burner is controlled.

3. A circuit as claimed in claim 1 comprising means to produce a "dead band" in which the probe may rise or fall by small amounts without causing the circuit to operate.

4. A circuit as claimed in claim 3 comprising manually controlled means to adjust the extent of the "dead band."

5. A circuit as claimed in claim 3 in which the "dead band" is produced by two diodes connected in the input circuits of the two halves of the differential amplifier, the width of the "dead band" being set by the voltage below which the diodes do not conduct in the forward direction.

6. A circuit as claimed in claim 1 in which the two outputs of the differential amplifier are connected respectively to the gates of the controlled rectifiers, the direct current motor being a split field motor of which the two halves of the field are fed by the respective controlled rectifiers, the direct current motor being a split field motor of which the two halves of the field are fed by the respective controlled rectifiers, the respective halves of the field winding producing magnetic fields of opposite senses to cause the motor to run in opposite directions.

7. A circuit as claimed in claim 1 in which the differentially connected transistors and the differential amplifier are combined in the form of two differentially connected Darlington pairs, comprising a unijunction transistor for each Darlington pair whose conduction is controlled by the respective Darlington pair, the initiation of conduction of each unijunction transistor causing a pulse to be applied to the gate of a respective controlled rectifier.

8. A circuit as claimed in claim 1 comprising a manually operated switch in the motor control circuit by which the motor may be stopped irrespective of the operation of the circuit.

9. A circuit as claimed in claim 1 in which each controlled rectifier is a silicon controlled rectifier.

10. A circuit as claimed in claim 1 comprising a manually operated switch in the motor control circuit connected to over-ride the automatic operation of the circuit and cause the motor to run in the direction to raise the burner.

References Cited

UNITED STATES PATENTS

| | | | |
|---|---|---|---|
| 2,364,645 | 12/1944 | Mott et al. | 266—23 M |
| 2,534,958 | 12/1950 | Deming | 266—23 MXR |
| 2,747,152 | 5/1956 | Greene | 266—23 MXR |
| 2,949,391 | 8/1960 | Anderson | 266—23 MXR |
| 3,024,354 | 3/1962 | Mierendorf et al. | 219—131 |
| 3,137,809 | 6/1954 | Freiberg | 318—356 XR |
| 3,217,204 | 11/1965 | Nance | 266—23 XR |
| 3,225,281 | 12/1965 | Petrinec | 266—23 XR |
| 3,286,127 | 11/1966 | Henry | 219—131 XR |
| 3,290,032 | 12/1966 | Brouwer | 266—23 |

FOREIGN PATENTS

| | | |
|---|---|---|
| 1,150,016 | 7/1957 | France. |

J. SPENCER OVERHOLSER, *Primary Examiner.*

R. S. ANNEAR, *Assistant Examiner.*